(12) United States Patent
Huang

(10) Patent No.: US 11,928,073 B2
(45) Date of Patent: Mar. 12, 2024

(54) CONFIGURABLE USB-C ALTERNATE MODE FOR MULTI-LEVEL CONTROLLER COMMUNICATION

(71) Applicant: Elo Touch Solutions, Inc., Milpitas, CA (US)

(72) Inventor: Chunying Huang, Fremont, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 794 days.

(21) Appl. No.: 16/748,141

(22) Filed: Jan. 21, 2020

(65) Prior Publication Data
US 2021/0224216 A1  Jul. 22, 2021

(51) Int. Cl.
*G06F 13/42* (2006.01)
(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS

2018/0060270 A1* 3/2018 Schnell ............... G06F 13/4022
2019/0042503 A1* 2/2019 Montero ............. G06F 13/4282
2020/0233822 A1* 7/2020 Zheng ................. G06F 3/1407

* cited by examiner

*Primary Examiner* — Idriss N Alrobaye
*Assistant Examiner* — Dayton Lewis-Taylor
(74) *Attorney, Agent, or Firm* — Sterne, Kessler, Goldstein & Fox P.L.L.C.

(57) ABSTRACT

Method, apparatus and computer program product embodiments are provided for configuring the USB-C alternate mode feature of a device. The device can be configured to transmit data to both USB-C devices and legacy (non-USB) devices without requiring changes to the device's firmware. Adjusting a USB-C output setting in the device allows the USB-C alternate mode to be switched on or off which enables the device to be updated based on the USB-C capability of other devices connected to the device.

15 Claims, 5 Drawing Sheets

CONFIGURABLE USB-C ALTERNATE MODE FOR MULTI-LEVEL CONTROLLER COMMUNICATION

BACKGROUND

Technical Field

The subject matter disclosed herein relates generally to configuring USB-C modes using a configuration channel based on configuration channel information and its commands.

Background

Universal Serial Bus Type-C or USB-C has a mode called alternate mode which allows output of a USB-C cable to be configured as a 4-lane Display Port (DP)/High-Definition Multimedia Interface (HDMI) plus USB 2.0 output, or a 2-lane DP/HDMI plus USB 3.0 output. In other words, USB-C allows operation of non-USB or "alternate" protocols over USB-C. But utilization of USB-C alternate mode presents challenges for devices, such as USB-C hubs, that connect to devices that support USB-C and devices that do not support USB-C, and therefore require use of the alternate mode function of USB-C.

SUMMARY

Provided herein are system, apparatus, device, method and/or computer program product embodiments, and/or combinations and sub-combinations thereof, for configuring USB-C alternate mode settings of devices. In some embodiments, the device may include multiple levels of USB-C controllers and configuring the settings of the device includes propagating a USB-C configuration through the multiple levels of USB-C controllers within the device.

An example method embodiment may include steps for determining whether a display device connected to an embedded controller within a host device is a USB-C compliant device and based on this determination, configuring a USB-C output setting in the controller to a first setting. The steps may also include the controller transmitting the first setting to a host type-C controller that is implemented within the host device and causing, by the controller, the host type-C controller to transmit the first setting to a device type-C controller.

The USB-C output setting establishes the protocol for each controller in host device where the protocol establishes USB transmission settings via a configuration channel (CC) for each of the controllers.

BRIEF DESCRIPTION OF THE DRAWINGS

The accompanying drawings are included to provide a further understanding of the claims, and are incorporated in and constitute a part of this specification. The detailed description and illustrated embodiments described serve to explain the principles defined by the claims.

In the drawings, like reference numbers generally indicate identical or similar elements. Additionally, generally, the left-most digit(s) of a reference number identifies the drawing in which the reference number first appears.

DETAILED DESCRIPTION

Figure 1A:
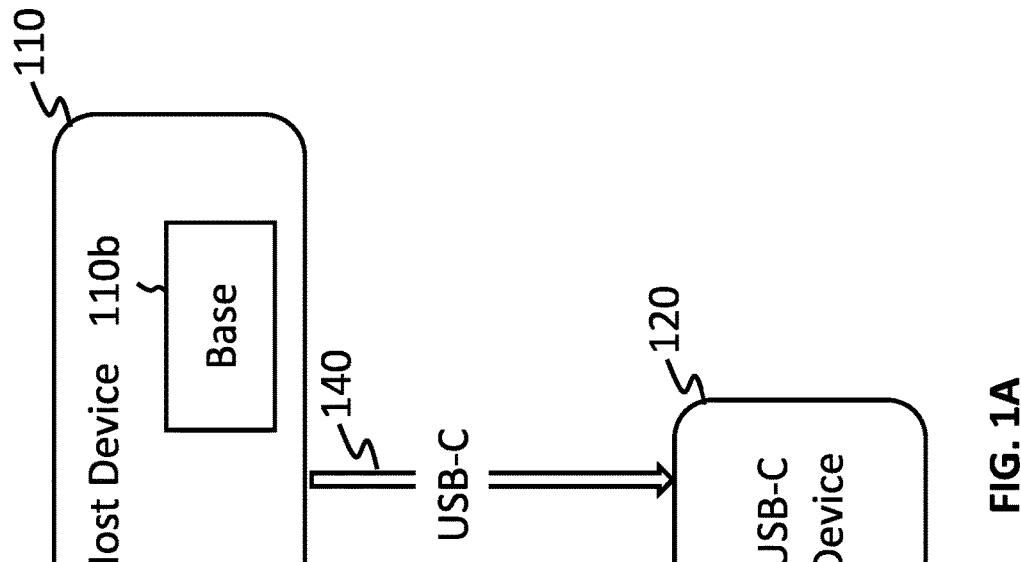
FIG. 1A is a block diagram of a system environment wherein embodiments can be implemented.

FIG. 1A is a block diagram of a system environment where embodiments can be implemented. System 100A includes host device 110 and USB-C device 120. Host device 110 can be connected to USB-C device 120 through USB-C connection 140. FIG. 1A illustrates a first alternate-mode operation of host device 110.

In an embodiment, host device 110 can be implemented as a computing device for communicating with display devices. Non-limiting examples of host device 110 include point-of-sale (POS) devices and hub devices. Host device 110 can also be implemented as a computing device that includes multiple levels of USB-C controllers. As one non-limiting example, host device 110 can be implemented having a host USB-C controller, a device USB-C controller, and a second device USB-C controller. Host device 110 can also be implemented with multiple input/output ports such as USB-C ports and standard USB ports.

In an embodiment, host device 110 is implemented as a POS device that includes head-end 110a and base 110b. Head-end 110a can be implemented as a display device. Head-end 110a can be integrated with base 110b or as separate devices. Head-end 110a can be connected to base 110b through a USB-C cable. Head-end 110a can be implemented with a first USB-C controller, such as a host USB-C controller. Base 110b can be implemented with additional USB-C controllers such as multiple device USB-C controllers.

Figure 1B:
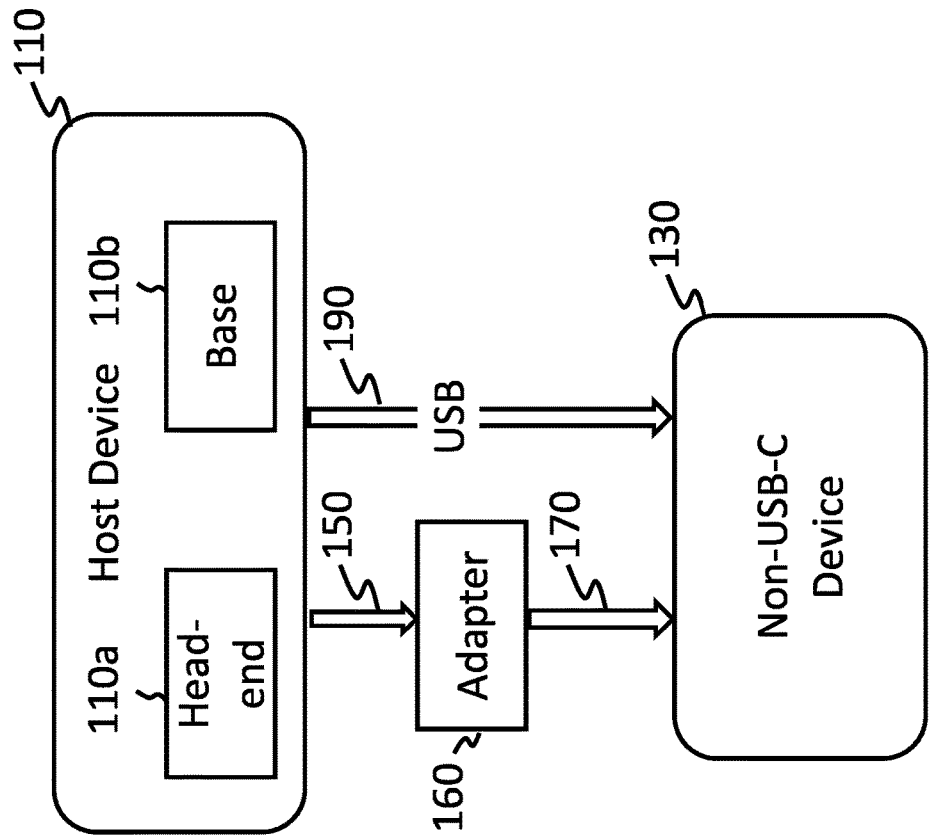
FIG. 1B is a block diagram of another system environment wherein embodiments can be implemented.

Host device 110 can be further configured to connect to another device such as USB-C device 120 or non-USB-C device 130 (discussed in FIG. 1B). In an embodiment, USB-C device 120 can be implemented as a display or output device. In this embodiment, head-end 110a can be used a first display device and USB-C device 120 and/or non-USB-C device 130 can be used as the secondary display device for host device 110.

In an embodiment, USB-C device 120 can connect to host device 110 using USB-C connection 140 which can be implemented as a USB-C cable that plugs into the respective USB-C ports of USB-C device 120 and host device 110. Through a single connection, such as a single USB-C cable, power can be supplied and data can be transmitted between USB-C device 120 and host device 110. For example, USB-C connection 140 can provide power from host device 110 to USB-C device 120 and can provide data between host device 110 and USB-C device 120. Data includes video data from host device 110, touch information from head-end 110a, and touch information from USB-C device 120.

FIG. 1B is a block diagram of a system environment where embodiments can be implemented. System 100B includes host device 110 and non-USB-C device 130. FIG. 1B illustrates a second alternate-mode operation of host device 110. Host device 110 can be connected to non-USB-C device 130 through a first connection 150, adapter 160, a second connection 170, and a standard (non-USB-C) USB connection 190 which may supply power to non-USB-C device 130. In an embodiment, non-USB-C device 130 can be implemented as a display or output device. In this embodiment, head-end 110a can be used a first display device and non-USB-C device 130 can be used as the secondary display device for host device 110.

In an embodiment, connections between host device 110 and non-USB-C device 130 can be implemented through a USB-C connection 150, USB-C adapter 160, DP/HDMI connection 170, and standard USB connection 190. Non-USB-C device 130 lacks a USB-C connection and can be implemented with any combination of a DP port, an HDMI port, and a standard USB port. USB-C connection 150 can be implemented using a USB-C cable. DP/HDMI connection 170 can be implemented as either a DP (display port) connection or an HDMI connection. USB-C adapter 160 can be implemented as an USB-C to DP/HDMI adapter which translates signals provided by USB-C connection 150 to HDMI and/or DP signals for transmission over DP/HDMI connection 170 depending on the available ports of non-USB-C device 130. In some embodiments, these signals include video data. Standard USB connection 190 can be used to provide power from host device 110 to non-USB-C device 130 and touch data between host device 110 and non-USB-C device 130.

In the field of USB-C engineering, the term "alternate mode" has a technical meaning as described in USB-C specifications. There can be many types of alternate modes. Exemplary alternate modes will be discussed below but the disclosure is not limited to merely these examples.

When USB-C device 120 is connected to host device 110, a USB-C output setting of host device 110 can be set to indicate transmission of data using lanes associated with a first USB-C alternate mode (USB 3.0 plus 2-lane DP/HDMI) since USB-C device 120 is capable of receiving USB information and DP/HDMI information are not necessarily required to be transmitted in 4-lane bandwidth. When non-USB-C device 130 is connected to host device 110, a USB-C output setting of host device 110 can be set to indicate transmission of data using lanes associated with a second USB-C alternate mode including utilizing additional lanes that are typically reserved for USB 3.0 for 4-lane DP or HDMI transmission. In this case, USB 2.0 transmissions can be utilized in this second USB-C alternate mode for USB data communication.

Conventional host devices are not capable of supporting both USB-C and non-USB-C devices without first changing the firmware versions to support the different types of devices such as USB-C device 120 and non-USB-C device 130. Host device 110 is an improvement over such conventional host devices by including a configurable mechanism for toggling between USB-C alternate mode options of host device 110. In an embodiment, this configurable mechanism can be implemented as a setting in the basic input/output system (BIOS) of host device 110. A person skilled in the art would understand that BIOS represents firmware that is used for initializing hardware of host device 110, such as during a booting process.

In the setting of the first USB-C alternate mode, USB-C output is configured as a 2-lane DP or HDMI output in combination with USB 3.0 output. In this setting, only two lanes are reserved for DP or HDMI output (i.e., transmitting DP or HDMI data) which allows USB-C output to utilize the USB 3.0 superspeed lane to transmit data using USB 3.0. In the setting of the second USB-C alternate node, USB-C output is configured as a 4-lane DP or HDMI output in combination with USB 2.0 output. In order to provide four lanes of DP or HDMI output, the first setting configures the USB-C output to utilize certain lanes including a USB 3.0 superspeed lane, that are typically reserved for USB 3.0 transmissions. A person skilled in the art would understand that USB 3.0 is faster than USB 2.0 since it utilizes the superspeed lane, which has faster throughput for transmitting data.

In embodiments described in this disclosure, host device 110 is configurable to the settings of the first and second USB-C alternate mode depending on the connected devices. For example, when host device 110 is connected to USB-C device 120, host device 110 can be configured to the setting of the first USB-C alternate mode to transmit data using the faster superspeed lane. In this case, all USB devices connected to host device 110 can utilize USB 3.0 bandwidth instead of USB 2.0 bandwidth. In some embodiments, USB-C connection 140 is configured to receive 4-lane DP or HDMI data from host device 110. The 4-lane DP or HDMI data can be provided as input to adapter 160 for conversion into DP or HDMI data output to non-USB-C device 130 via DP/HDMI connection 170. In this embodiment, when host device 110 is connected to non-USB-C device 130 via adapter 160 using USB-C connection 140, host device 110 can be configured to the setting of the second USB-C alternate mode for transmission of 4-lane DP or HDMI data.

Figure 2:
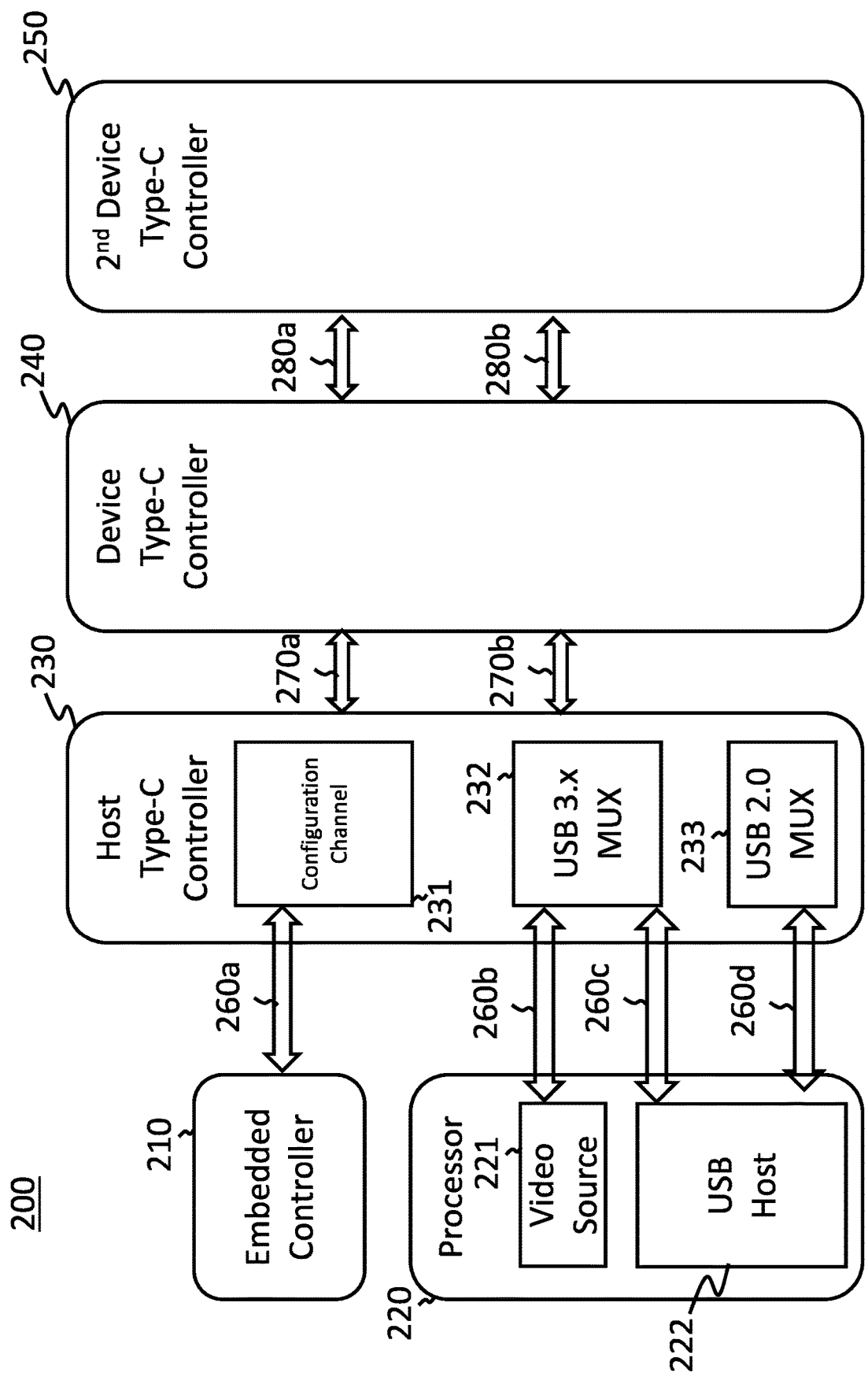
FIG. 2 is a block diagram of a USB-C device implementing alternate mode configuration through multiple controller levels, according to an embodiment.

FIG. 2 is a block diagram of a host device 200 implementing alternate mode configuration through multiple controller levels in host device 200, according to an embodiment. In some embodiments, host device 200 represents an implementation of host device 110 of FIG. 1. Host device 200 can include embedded controller 210, processor 220, host type-C controller 230, device type-C controller 240, and second device type-C controller 250. Embedded controller 210 can be implemented in a head-end of host device 200 such as head-end 110a. In an alternate embodiment, embedded controller 210 may be in a base of host device such as base 110b. While only three controllers are illustrated in FIG. 2, this implementation is not limited to this embodiment and can include more controllers.

Embedded controller 210 is connected to host type-C controller 230 through connection 260a. In an embodiment, connection 260a can be implemented as an inter-integrated circuit ($I^2C$). Embedded controller 210 reconfigures the settings of downstream controllers in host device 200. In this embodiment, embedded controller 210 transmits USB-C configuration information using connection 260a to host type-C controller 230. Host type-C controller 230 updates its USB-C configuration setting based on the provided USB-C configuration information. For example, the USB-C output setting can be updated to indicate that host device 200 is to transmit data using one of the USB alternate mode procedures. Another setting of the USB-C output setting indicates that host device 200 transmits data using another USB alternate mode procedure such as USB 2.0 plus 4-lane DP/HDMI data.

Processor 220 can include video source 221 and USB host 222. Host type-C controller 230 can include configuration channel 231, USB 3.x MUX 232, USB 2.0 MUX 233. In an embodiment, configuration channel 231 includes circuitry needed to support its function such as configuration channel logic circuits, logic level inputs and outputs, to name a few examples. In some embodiments, USB 3.x MUX 232 can be implemented as a USB 3.1 and alternate mode mux. USB 3.x MUX 232 moves USB signals between multiple ports of host type-C controller 230 based on the USB 3.x protocol which allows USB 3.x MUX 232 to utilize the USB 3.0 superspeed lane. USB 2.0 MUX 233 also moves USB signals between multiple ports of host type-C controller 230 but is based on the USB 2.0 protocol and therefore does not utilize the USB 3.0 superspeed lane.

Video source 221 can be implemented for transmitting HDMI or DP video signals through connection 260b which can be implemented as multiple lanes for transmitting the HDMI or DP video signals from video source 221 to USB 3.x MUX 232. In an embodiment, connection 260b may be implemented as two separate connections with each connection comprising two lanes for transmitting the HDMI or DP video signals from video source 221. USB host 222 can be implemented for transmitting USB data through connection 260c and/or connection 260d. In some embodiments, connection 260c can be implemented as a USB 3.0 connection for transmitting data to USB 3.x MUX 232 and connection 260d can be implemented as a USB 2.0 connection for transmitting data to USB 2.0 MUX 233. Transmission of data over connection 260c and/or connection 260d is based on the USB configuration or output setting of host device 200 that indicates the desired USB alternate mode. A first setting of the USB output setting can indicate that host device 200 is to utilize one configuration of the USB alternate mode (e.g., 2 lane DP or HDMI plus USB 3.0 communication) and a second setting of the USB output setting can indicate that host device 200 is to utilize another configuration of the USB alternate mode (e.g., 4 lane DP or HDMI plus USB 2.0 communication). As previously discussed, the USB output setting of host device 200 can be based on the USB capability of the device (e.g., USB-C, non-USB-C) connected to host device 200.

In some embodiments, embedded controller 210 initiates a USB-C configuration process for configuring controllers within host device 200 for utilizing the USB-C alternate mode. Embedded controller 210 may be configured to initiate the USB-C configuration process through a USB-C configuration setting in embedded controller 210. In some embodiments, this USB-C configuration setting is a BIOS setting in embedded controller 210. The USB-C configuration setting may be configured based on whether a USB-C device or a non-USB-C device are connected to host device 200. In an embodiment, host device 200 may make this determination through detecting whether a connected device is USB-C device or a non-USB-C device. This detection can involve receiving a signal from the connected device and processing by host device 200 of the signal to determine the type of the connected device.

Embedded controller 210 can configure a USB-C output setting for type-C controllers of host device 200 such as host type-C controller 230, device type-C controller 240, and second device type-C controller 250. The USB-C output setting can control the USB alternate mode of the host device. For example, a first setting of the USB-C output setting can enable data transmission of the host type-C controller 230, device type-C controller 240, and second device type-C controller 250 using 2-lane DP/HDMI and USB 3.0 output while a second setting of the USB-C output setting can enable data transmission using 4-lane DP/HDMI and USB 2.0 output.

The USB-C configuration (or setting) for the USB-C output setting can be transmitted from host type-C controller 230 to other type-C controllers that are implemented in host device 200. For example, Host type-C controller 230 can transmit the USB-C configuration setting to device type-C controller 240 via connection 270a. A first USB-C setting indicates that host device 200 is to transmit using USB 3.0 (such as illustrated in FIG. 1A) and a second USB-C setting indicates that host device 200 is transmit using a different USB-C alternate mode. In some embodiments, connection 270a can be implemented as a configuration channel line which provides the USB-C configuration setting (i.e., whether to implement USB-C alternate mode transmission) to device type-C controller 240. Connection 270b can be implemented to connect host type-C controller 230 and device type-C controller 240. Connection 270b can be used to transmit USB data between USB 3.x MUX 232 and/or USB 2.0 MUX 233 from host type-C controller 230 to device type-C controller 240. In some embodiments, connections 270a and 270b are implemented as a USB type-C plug interface.

If host device 200 includes additional device type-C controllers, the USB-C configuration for the USB-C output setting can continue to be cascaded to the additional device type-C controllers. FIG. 2 illustrates a second device type-C controller but is not limited to this configuration (e.g., may include more device type-C controllers). In this embodiment, the USB-C configuration (or setting) for the USB-C output setting can be transmitted from device type-C controller 240 to second device type-C controller 250 via connection 280a. In some embodiments, connection 280a can be implemented as a configuration channel line which provides the USB-C configuration setting (i.e., whether to implement USB-C alternate mode transmission) to second device type-C controller 250. Connection 280b can be implemented to connect device type-C controller 240 and second device type-C controller 250. Connection 280b can be used to transmit USB data between USB muxes (not shown) such as USB 3.x MUX and/or USB 2.0 MUX from device type-C controller 240 to second device type-C controller 250. In some embodiments, connections 280a and 280b are implemented as a USB type-C plug interface.

Figure 3:
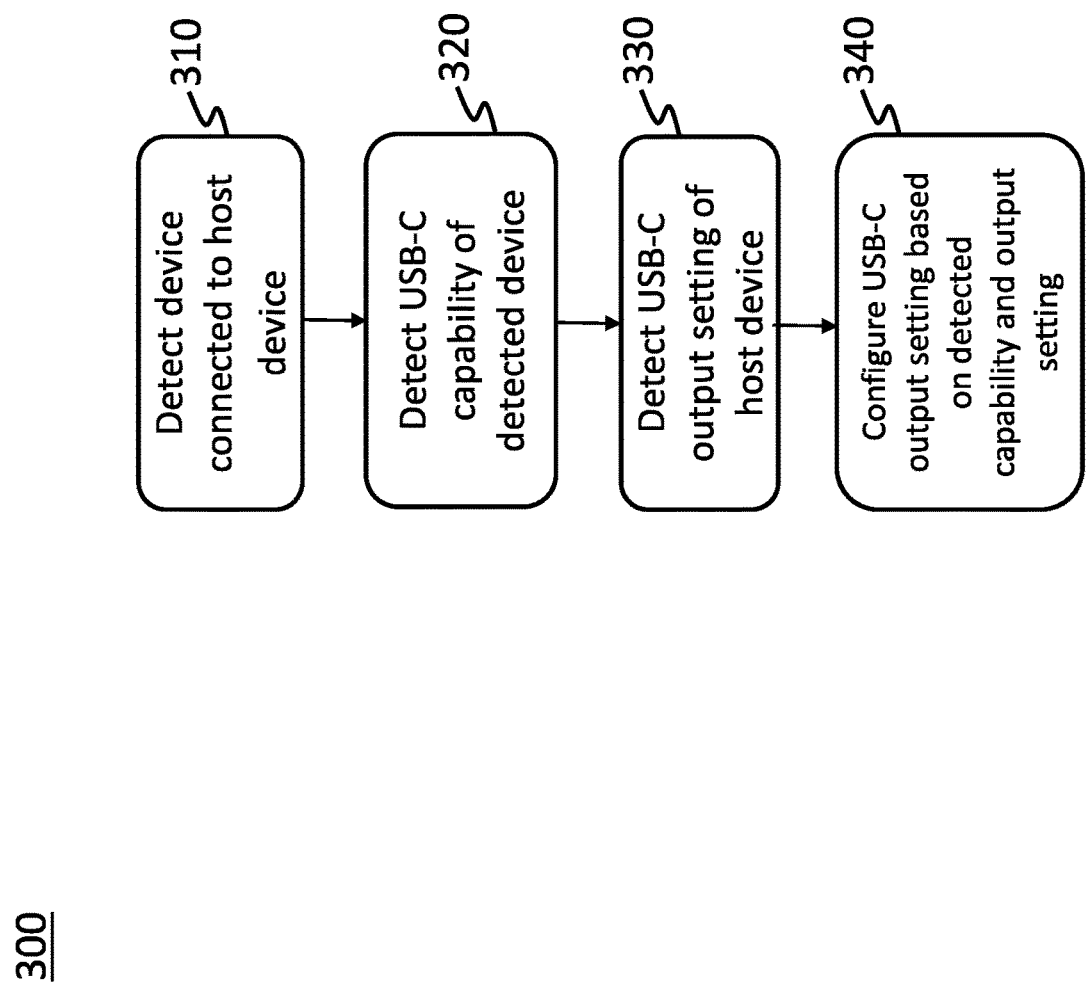
FIG. 3 is a flow diagram illustrating a method for implementing an USB-C alternate mode configuration, according to an embodiment.

FIG. 3 is a flow diagram illustrating a method for implementing an USB-C alternate mode configuration, according to an embodiment. As a non-limiting example with regards to FIGS. 1A-B and 2, one or more processes described with respect to FIG. 3 may be performed by a host device (e.g., host device 110 of FIG. 1 or host device 200 of FIG. 2) for configuring settings of a USB-C alternate mode of the host device. In such an embodiment, host device 110 and/or host device 200 may execute code in memory to perform certain steps of method 300 of FIG. 3. While method 300 of FIG. 3 will be discussed below as being performed by host device 110 and/or host device 200, other devices including may store the code and therefore may execute method 300 by directly executing the code. Accordingly, the following discussion of method 300 will refer to devices of FIGS. 1A-B and 2 as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 310, any devices connected to a host device (e.g., host device 110 or host device 200) are detected. This detection can be performed by host device through connected USB ports. For example, in step 310, the host device may determine if only a USB-C connection (cable) has been connected to the host device as in FIG. 1A with connection 140, or whether the host device has been connected to both a USB-C connection (cable) and a second USB connection that is not USB-C as in FIG. 1B with connections 150 and 190. In an alternate embodiment, the human technician who plugged in the cable or cables as observed what is connected to the host device and can inform the host device via an appropriate software interface.

In 320, the USB-C capabilities of detected devices are detected. For example, host device can determine whether a detected device is a USB-C device that supports USB-C transmission or a non-USB-C device that does not support USB-C transmission. Furthermore, the host device can determine whether a detected USB-C device supports more USB-C functions such as a USB-C display device (an example of USB-C device 120 of FIG. 1A) or supports fewer USB-C functions such as the adapter 160 of FIG. 1B.

In 330, host device then detects its current USB-C output setting to determine whether its current USB output setting matches the USB-C capability of the detected device. For example, host device may detect that it's USB-C output setting is currently set for USB-C alternate mode transmission or set for standard USB-C transmission (i.e., utilizing USB 3.0 lanes). In actual code, steps 320 and 330 may either be separate steps or are combined into one step that determines both connections present and capabilities of connected devices.

In 340, host device then configures its USB-C output setting based on the detected capability of the detected device and the current USB-C output setting of the host device, if needed. For example, if the current USB-C output setting indicates that host device is configured for transmitting using USB 3.0 (such as illustrated in FIG. 1A) and the detected device has full USB-C capability, then no change needs to be made since the host device is configured to transmit data using USB-C. But if the detected device has limited USB-C capability, such as adaptor 160 of FIG. 1B, then the host device can update its USB-C output setting to indicate transmitting data in a different USB-C alternate mode. As discussed above, updating of the USB-C output setting in the host device can result in updating the respective USB-C settings in any controllers implemented within the host device. Step 340 may be completely automated so that the desired mode is implemented with no human intervention. Alternatively software (perhaps embedded software) may prompt a human operator to select or confirm the desired configuration. Configuration information that is transmitted by the host device down USB-C control channels may be stored in the host device BIOS or in another form of non-volatile memory accessible to the host device.

Figure 4:
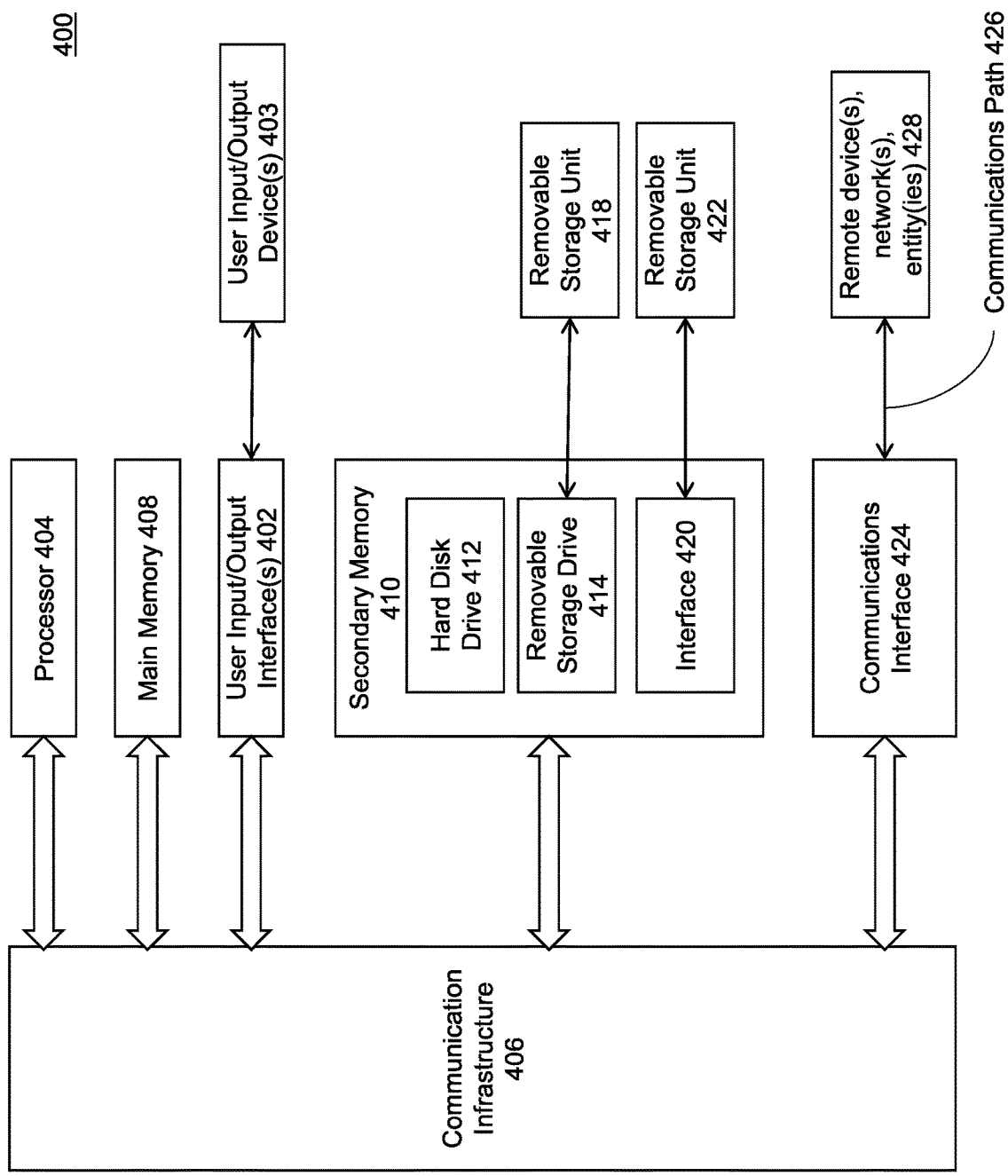
FIG. 4 is a block diagram of a computer system where the embodiments can be implemented.

Various embodiments of host device 110, USB-C device 120, non-USB-C device 130, and host device 200 as described in FIGS. 1A-B and 2 can be implemented, for example, using one or more well-known computer systems, such as computer system 400 shown in FIG. 4, or some or all components in computer system 1000. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache(s). Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/or any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communication path 426, which may be wired and/or wireless, and which may include any combination of LANs, WANs, the Internet, etc. Control logic and/or data may be transmitted to and from computer system 400 via communication path 426.

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

The invention claimed is:

1. A method for configuring a USB-C output setting in a host device, the method comprising:
    receiving, by the host device, a signal from a display device;
    determining, by an embedded controller within the host device and based on the signal, whether the display device connected to the host device is a USB-C device;
    configuring, by the embedded controller, the USB-C output setting in the embedded controller to a first setting based on determining that the display device is the USB-C device, wherein the USB-C output setting controls USB-C alternate modes of the host device;
    transmitting, by the embedded controller, the first setting to a host type-C controller;
    causing, by the embedded controller, the host type-C controller to transmit the first setting to a device type-C controller, wherein the first setting is configured to adapt the device type-C controller for transmitting data using four lanes of the device type-C controller; and
    causing, by the host type-C controller, the device type-C controller to transmit the first setting to a second device type-C controller wherein the first setting is configured to adapt the second device type-C controller for transmitting second data using four lanes of the second device type-C controller.

2. The method of claim 1, wherein the USB-C output setting is configured to the first setting and wherein a USB-C interface is implemented in the host device, the method further comprising:
    transmitting, by the host device and based on the first setting, data using two lanes of the USB-C interface for display data on the display device and two lanes of the USB-C interface for USB 3.0 communications.

3. The method of claim 1, wherein the USB-C output setting is a BIOS setting of the embedded controller.

4. The method of claim 1, further comprising:
    configuring the USB-C output setting to a second setting based on determining that the display device is a non-USB-C compliant device.

5. The method of claim 4, wherein the USB-C output setting is configured to the second setting and wherein a USB-C interface is implemented in the host device, the method further comprising:
    transmitting, by the host device, data using four lanes of the USB-C interface for display data on the display device.

6. A host device, comprising:
    a display interface;
    a host type-C controller;
    a device type-C controller;
    a second device type-C controller;
    a memory; and
    an embedded controller communicatively coupled to the memory and configured to:
        receive, by the host device, a signal from a display device;
        determine, based on the signal, whether the display device connected to the display interface is a USB-C device;
        configure a USB-C output setting to a first setting based on determining that the display device is the USB-C device, wherein the USB-C output setting controls USB-C alternate modes of the host device;
        transmit the first setting to the host type-C controller;
        cause the host type-C controller to transmit the first setting to the device type-C controller, wherein the first setting is configured to adapt the device type-C controller for transmitting data using four lanes of the device type-C controller; and
        cause the device type-C controller to transmit the first setting to the second device type-C controller wherein the first setting is configured to adapt the second device type-C controller for transmitting second data using four lanes of the second device type-C controller.

7. The host device of claim 6, further comprising a USB-C interface and wherein when the USB-C output setting is configured to the first setting, the embedded controller is further configured to:
    transmit, based on the first setting, data using two lanes of the USB-C interface for display data on the display device and two lanes of the USB-C interface for USB 3.0 communications.

8. The host device of claim 6, wherein the USB-C output setting is a BIOS setting of the embedded controller.

9. The host device of claim 6, wherein the embedded controller is further configured to:
    configure the USB-C output setting to a second setting based on determining that the display device is a non-USB-C device.

10. The host device of claim 9, wherein when the USB-C output setting is configured to the second setting, the embedded controller is further configured to:
    transmit, by the embedded controller, data using four lanes of a USB-C interface implemented in the host device.

11. A non-transitory computer-readable medium storing instructions, wherein the instructions, when executed by a processor of a host device, cause the processor to perform operations comprising:
    receiving, by the host device, a signal from a display device;

determining, based on the signal, whether the display device connected to the host device is a USB-C device;

configuring a USB-C output setting to a first setting based on determining that the display device is a non-USB-C device, wherein the USB-C output setting controls USB-C alternate modes of the host device;

transmitting the first setting to a host type-C controller in the host device;

causing the host type-C controller to transmit the first setting to a device type-C controller in the host device, wherein the first setting is configured to adapt the device type-C controller for transmitting data using four lanes of the device type-C controller; and causing the device type-C controller to transmit the first setting to a second device type-C controller wherein the first setting is configured to adapt the second device type-C controller for transmitting second data using four lanes of the second device type-C controller.

12. The non-transitory computer-readable medium of claim 11, wherein the USB-C output setting is configured to the first setting and wherein a USB-C interface is implemented in a host device, the operations further comprising:

transmitting, by the host device and based on the first setting, data using two lanes of the USB-C interface for display data on the display device and two lanes of the USB-C interface for USB 3.0 communications.

13. The non-transitory computer-readable medium of claim 11, wherein the USB-C output setting is a BIOS setting of an embedded controller in the host device.

14. The non-transitory computer-readable medium of claim 11, the operations further comprising:

configuring the USB-C output setting to a second setting based on determining that the display device is a non-USB-C compliant device.

15. The non-transitory computer-readable medium of claim 14, wherein the USB-C output setting is configured to the second setting and wherein a USB-C interface is implemented in the host device, the operations further comprising:

transmitting, by the host device, data using four lanes of the USB-C interface for display data on the display device.

\* \* \* \* \*